Oct. 15, 1968  L. F. SCHMID  3,405,785
SELF-ENERGIZING, SPOT-TYPE DISK BRAKE
Filed June 8, 1967  2 Sheets-Sheet 1

INVENTOR.
LEOPOLD FRANZ SCHMID
BY
Karl F. Ross
ATTORNEY.

Oct. 15, 1968   L. F. SCHMID   3,405,785
SELF-ENERGIZING, SPOT-TYPE DISK BRAKE
Filed June 2, 1967   2 Sheets-Sheet 2

INVENTOR.
LEOPOLD FRANZ SCHMID
BY
Karl F. Ross
ATTORNEY.

3,405,785
SELF-ENERGIZING, SPOT-TYPE DISK BRAKE
Leopold Franz Schmid, Stuttgart, Germany, assignor to Alfred Teves Maschinen- und Armaturenfabrik KG, Frankfurt am Main, Germany, a corporation of Germany
Filed June 8, 1967, Ser. No. 644,679
Claims priority, application Germany, June 18, 1966, T 31,388
11 Claims. (Cl. 188—73)

ABSTRACT OF THE DISCLOSURE

Disk-brake system wherein a brake disk is rotatable relatively to a brake support or yoke disposed along the periphery of the disk; a pair of hydraulic main brakeshoes is mounted on the support on opposite side of the disk. The mechanically operable hand brake system includes a pair of auxiliary brakeshoes mounted on the support and confrontingly juxtaposed with one another on opposite sides of the disk, guide means on the support co-operating with the auxiliary brakeshoes for urging one of them against said disk upon its entrainment in a self-tightening action; the other brakeshoe is urged against said disk in a direction counter to the self-tightening force of the first brakeshoe, thereby preventing distortion of the disk upon application of the auxiliary brake system.

---

The present invention relates to brake systems for automotive vehicles and, more particularly, to mechanically operated disk brakes of the type generally used in conjunction with hydraulic or pneumatic brakes as auxiliary braking devices, parking brakes, locking brakes and/or emergency brakes.

It is a common practice, in connection with automotive-vehicle brakes, to provide a main brake system of the hydraulic or pneumatic type in which the brakeshoes are urged against the rotating brake disk by a fluid-operated piston, while locking of the brakes can be effected mechanically from the operator position in the vehicle via a lever linkage, cable or the like which retains one or both of these brakeshoes in engagement with the braking surface. Disk-type brakes have brakeshoes which lie generally in planes parallel to the brake disk and are applied by respective cylinders in a stationary yoke behind these shoes or by a single cylinder via a movable yoke which transmits reaction force to the brakeshoe remote from this cylinder. In such systems, the mechanical transmission of force to the brakeshoes is difficult and may involve problems in relocation and configuration of the cylinders, etc. when mechanical (manually operable) means are used. In such arrangements, therefore, it has been proposed to provide, in a common housing with the actuating means for the fluid-responsive brake, a pair of auxiliary brakeshoes flanking the disk and adapted to be applied by mechanical means to the disk to lock the disk with respect to the housing as an auxiliary, emergency, parking or locking brake.

In the commonly assigned copending application Ser. No. 642,398, entitled "Mechanically Operable Disk Brake," filed May 31, 1967, I, together with others, have described and claimed a parking, emergency or locking brake for an automotive vehicle having a flexible cable, such as a Bowden line, whereby a pair of self-tightening brakeshoes are brought to bear against the disk. In this system, the brakeshoes have backing plates in direct inclined-plane relationship with the brake support or housing, while the actuating means is formed by a pair of levers; this inclined-plane relationship ensures a self-tightening action between the backing plates and the respective portions of the brake yoke or housing independently of the actuating means. Thus the brake housing or support and the brakeshoes are provided with cooperating and directly engaging cam surfaces for wedging each brakeshoe against the respective surface of the disk when the corresponding actuating lever urges the brakeshoe against the disk and the disk frictionally entrains the brakeshoe. Springs act upon each brakeshoe and are seated against the brake housing or support for restoring the brakeshoes to an initial position with respect to the camming surfaces when the levers are released; the camming ramps are dimensioned such that a relatively strong self-tightening action is provided when the brakeshoe is frictionally entrained with the disk but is incapable of blocking return of the brakeshoes along the camming ramps when the levers are released. By providing that the brakeshoes bear directly against the housing and are wedged between the latter and the disk, it is possible to ensure that the actuating system and the other moving parts of the mechanical brakes are free from stresses arising from the reaction forces of the self-tightening action. In that system, a floating effect is provided for the two levers by pivoting the levers to the housing on respective sides of the disk and enabling the levers to bear against the brakeshoes which, in turn, are floatingly suspended on the housing by the springs. The levers are dimensioned and fulcrumed to form a four-point linkage whose four sides, in any given relative position of the levers (with reference to the degree of tightening thereof), can shift with respect to the housing or brake support, while the four sides of the linkage (i.e. the imaginary lines connecting the four pivots) remain of constant length.

Mechanically operated disk brakes for locking, emergency-stopping and parking purposes, have hitherto been characterized by relatively complex actuating systems as noted generally above. It is, therefore, the principal object of the present invention to extend the principles originally set forth in the commonly assigned copending application identified earlier and to provide a mechanically operable brake in conjunction with the usual hydraulic disk brake which is of simplified structure and cost, which provides a positive self-tightening action, and which is free from a tendency to breakdown.

A further object of this invention is to provide, in a disk-brake system having a yoke extending around the periphery of the disk and a hydraulic-brake arrangement carried by the yoke, a mechanically operable self-tightening brake which is located conveniently, is readily accessible for repair and inspection, and is engageable in the disk in a self-tightening manner.

The above and other objects of this invention are attainable in a disk-brake system having a pair of mechanically actuated brakeshoes in the brake support in which the normal hydraulically operated brakeshoes are disposed. The support can thus, according to this invention, consists of a yoke extending around the periphery of the disk and carrying the hydraulic actuating means for the main brake. The brakeshoes of the mechanical brake, which may be a parking, emergency or locking brake, are disposed on opposite sides of the disk in juxtaposition so that the axial forces applied by one of these mechanically operated brakeshoes to the disk is counteracted by the opposing force of the other mechanically actuated brakeshoe. Both brakeshoes are mounted in the stationary yoke or support which is provided with control or guide surfaces adapted to wedge the brakeshoes against the disk upon their entrainment with the rotating disk in a self-tightening action.

According to a specific feature of this invention, the guide or wedging surfaces upon the yoke or support and the complementary guide portions of the mechanically actuated brakeshoes are oriented to provide different degrees of a self-tightening action, depending upon the sense of rotation of the disk. Thus, the mechanically actuated brakeshoes may be urged with less pressure against the disk when the disk is rotated in the sense corresponding to "reverse" movement of the vehicle, whereas "forward" movement thereof brings the brakeshoes to bear with higher braking force. In this respect, the system can be designed so that the guides surfaces of the brake yoke are effective only with rotation of the disk in one sense.

Still another feature of this invention resides in the provision of a stationary yoke adapted to take up the reaction force of the self-tightening operation of the mechanical brake without any relative axial movement of the yoke and disk. In this case, guide surfaces are formed directly on the yoke and co-operate with the complementary surfaces on the brakeshoes. The actuating means can then include a lever adapted to draw the brakeshoes against the wedging surfaces of the yoke which are inclined at acute angles with respect to the braking faces of the disk in the direction in which the actuating lever moves the brakeshoes into the engaged position. The guide surfaces are inclined to the direction of movement of the brake face and the respective axial faces of the brake disk running between the brakeshoes. The control or wedging surfaces of the yoke can be parallel to one another and inclined at the identical angle to the longitudinal median plane of the brake disk, or, alternatively, inclined to the braking faces and disk plane at different angles so that, for example, the self-tightening action and the braking-actuation force generate an axial pressure on one of the brakeshoes against the counteracting force of the other. In practice, this arrangement has been found to provide a proper balance of axial force on the disk and accordingly reduces strength on the yoke and the disk.

These and other objects, features and advantages of the present invention will become more readily apparent from the following description, reference being made to the accompanying drawing in which.

Figure 1:
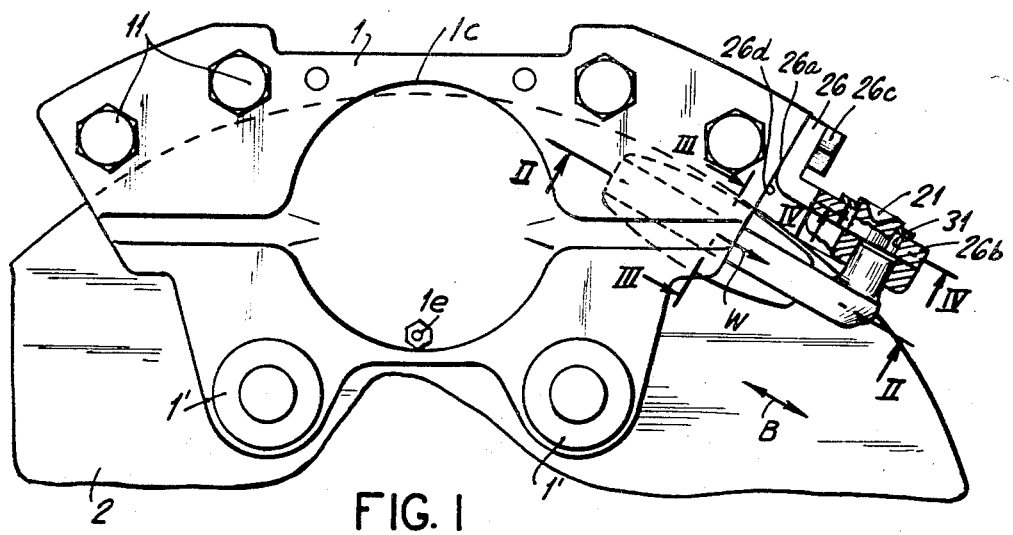
FIG. 1 is a fragmentary side elevational view, partly broken away, of a hydraulic brake provided with a locking brake in accordance with this invention.

Referring first to FIGS. 1–4, it can be seen that the vehicle-brake system of this invention comprises a brake yoke 1 which is fixedly mounted upon the axle housing of a vehicle wheel via the bosses 1' in the usual manner. The yoke 1, which is separable into the yoke halves 1a and 1b upon the removal of the bolt 1", extends about a sector of the periphery of the brake disk 2 which is driven reversibly (arrow B) by the shaft of the vehicle and is bolted to the wheel thereof. The yoke 1 carries a pair of brake cylinders 1c and 1d which may be supplied with hydraulic fluid via fittings such as is shown at 1e, and contain hydraulically displaceable pistons (as shown for example in the aforementioned patent application Ser. No. 642,398) respectively urging the main brakeshoes 3 and 4 against the disk 2. The brakeshoes 3 and 4 respectively are formed with backing plates 3a and 4a, against which the force of the hydraulic pistons are applied, the friction linings 3b, 4b confronting the opposite braking faces 2a and 2b of the disk. For the most part, these braking faces are parallel to the longitudinal median plane P of the yoke and the brake disk. Under normal braking conditions, hydraulic fluid is fed from the master cylinder of the vehicle (see the aforementioned copending application) to apply the brakeshoes 3 axially to the disk 2, thereby braking the rotation thereof with respect to the housing 1 and the vehicle body.

For emergency-braking purposes, to lock the vehicle against rolling when parked, or to prevent rotation of the wheels for any other reasons, an emergency, parking or locking auxiliary brake is provided. The auxiliary brake according to the present invention comprises a pair of brakeshoes 5 and respectively flanking the faces 2a and 2b of the disk 2 (see FIGS. 2 and 3) and received within respective recesses 5a and 5b in the yoke 1. The yoke halves 1a and 1b containing these recesses can be open in the direction of arrow W to enable withdrawal of the brakeshoes 5 and 6 for their relining, examination or repair. The brakeshoes 5 and 6 are provided with body portions 7 and 8, respectively, whose webs 7b and 8b extend perpendicularly to the flanges 7a and 8a so that the brakeshoes have generally T-shape cross-sections (FIG. 3). The brake linings 7c and 8c, respectively, are applied to the heads 7a and 8a of these shoes.

The camming or wedging surfaces 11, 12 provided in the respective halves 1a and 1b of the yoke at the bottoms of the recesses 5a and 5b, respectively, for engagement with the webs or shanks 7b or 8b, or inclined at acute angles for the median plane P of the disk 2 and, therefore, the braking faces 2a and 2b of the disk in the direction of movement of the respective brakeshoe 7 or 8 by the actuating lever as will be described in greater detail hereinafter. If the brake disk 2 rotates as represented by arrow D (FIG. 2), it will be frictionally entrained in this direction by the brakeshoe and, in consequence of the convergency between the control or camming surface 11 and brake face 2a engaged by the shoe 7, will be wedged tightly against the disk with an axial force component augmented by the wedging or self-tightening action as, for example, set forth in the aforementioned copending application. The other brakeshoe 8, of course, is concurrently brought to bear against the surface 12, although it is not entrained by the disk 2 in a self-tightening action when the disk moves in the direction of arrow D. The more limited wedging operation caused by the actuating means also, however, interposes the brakeshoe 8 between the surface 12 and the braking face 2b of the disk 2. Thus the nonself-tightening brakeshoe 8 acts as a support or backing member against axial distortion of the disk 2 when the brakeshoe 7 is applied.

It will be understood that, when the disk 2 rotates in the opposite direction (i.e., in a sense opposite to arrow B in FIG. 2), actuation of the brakeshoes will bring brakeshoe 8 to bear against the face 2b with self-tightening action as this brakeshoe is frictionally entrained with the disk 2 while the brakeshoe 7 will be wedged against the disk to serve as a counter force to the axial braking force. The term "axial" is used here to define relationship with the axis of the disk 2 and, therefore, also indicates forces perpendicular to the faces 2a, 2b and the plane P.

The wedging surfaces 11 and 12 on opposite sides of the disk 2 are inclined with their respective braking faces 2a and 2b in opposite directions, thereby ensuring that the self-tightening action will apply only to one of the two mechanical brakeshoes 7 or 8 in either direction of the disk 2 while the other brakeshoe acts as a countervailing force to prevent distortion of the disk. When the surfaces of the self-tightening mechanism are inclined at different angles $\beta$ and $\gamma$ with respect to the braking faces 2a' and 2b' (FIG. 5), the component of force applied during the self-tightening entrainment of the brakeshoes 7' and 8' against the disk 2' will vary in accordance with the sense of rotation of this disk. When, however, the surfaces 11 and 12 (FIG. 2) are parallel to one another and inclined at the same angle $\alpha$ to the plane P and respective faces 2a and 2b of the disk 2, the self-tightening forces will be the same in the forward and reverse direction of the vehicle movement.

Figure 2:
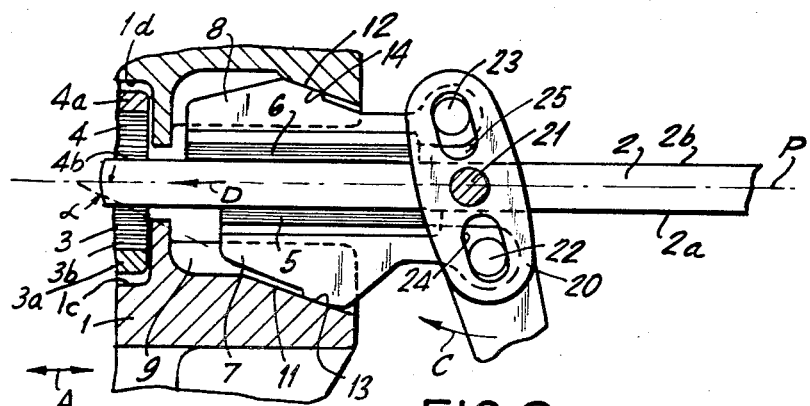
FIG. 2 is a cross-sectional view taken generally along the line II—II of FIG. 1.
Figure 3:
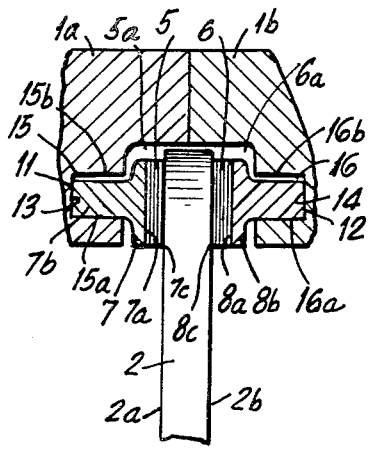
FIG. 3 is a cross-sectional view taken along the line III—III of FIG. 1.
Figure 4:
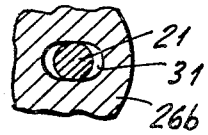
FIG. 4 is a view generally along the line IV—IV of FIG. 1.
Figure 5:
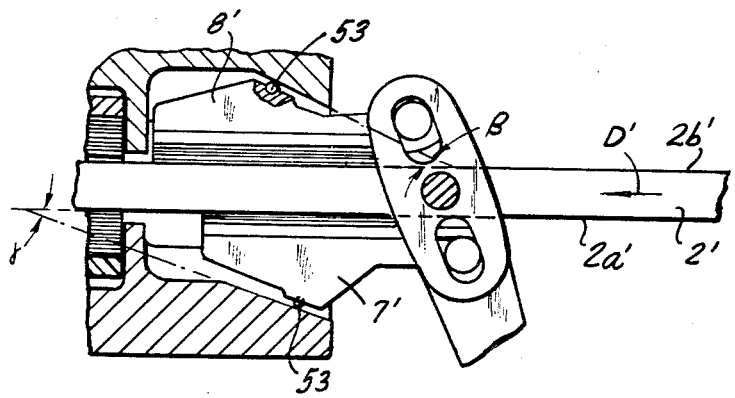
FIG. 5 is a view similar to FIG. 2 of another embodiment of this invention.

As is best seen from FIGS. 2 and 5, the wedging or control surfaces 11 and 12 are inclined to the direction of movement of the brakeshoes 7 and 8 as represented by the arrow A and are also inclined to the axial faces 2a and 2b of the disk 2. A greater self-tightening action is preferred in the forward direction of the vehicle than in the reverse direction thereof.

Figure 6:
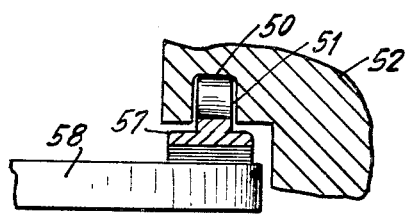
FIG. 6 is a fragmentary detail view of another modification.

In the system of FIGS. 1 to 3 it can be seen that the control surfaces 11 and 12 bear directly against the complementarily inclined surfaces 13 and 14 formed on the web 7b or 8b of the respective mechanically operated brakeshoe 7 or 8. The longitudinal median axis of the perpendicular webs 7b and 8b of the T, which are more or less shaped in accordance with the configuration of a right triangle, are perpendicular to the faces 2a and 2b, while these webs are guided in the grooves 15 and 16 of the stationary yoke 1. These grooves 15 and 16, which are set into the recesses 5a and 5b, have flanks 15a, 15b and 16a, 16b which guide these webs 7a and 7b and the brakeshoes 7 or 8 with respect to lateral forces and movement. The grooves 15 and 16 can be formed by milling the cast yoke in an operation which simultaneously forms the guide surfaces 11 and 12. When, however, friction losses are considered detrimental to the brake-operating efficiency, I prefer to provide roller or bearing means between the brake member 7 or 8 and the yoke 1. In this case, guide rollers 50 can be journaled in the grooves 51 of the yoke 52, the grooves 51 corresponding to the guide grooves 15 and 16 illustrated in FIG. 3. Alternatively, roller bodies 53 can be mounted in the web 7' or 8' of the auxiliary brakeshoes of the system of FIG. 5. In the system of FIG. 6, the brakeshoe is represented at 57 and the disk at 58. With these modifications, a practically frictionless relative movement between the yoke 1 or 52 and the brakeshoe 7,' 8' or 57 can be effected, thereby reducing the strain on the actuating means and obtaining greater self-tightening pressures upon entrainment of the brakeshoes with the disk. Advantageously, the widths of the recesses 5a and 5b in which the heads 7a and 7b of the brakeshoes 7 and 8 are received are in excess of that of these heads by an amount exceeding the clearance formed between the walls 15a and 15b or 16a and 16b of the recesses 15 and 16, whereby the flanks of the shanks 7b and 8b serve as guides for the brakeshoe without bringing the heads into contact with the yoke.

To control the mechanical brake, I provide a lever 20, which can be shifted by means of a Bowden line, flexible cable or other device connected to a lever at the operator's position in the vehicle, as described in the copending application, the lever 20 being fulcrumed at a pivot pin 21 about an axis which lies substantially in the longitudinal plane P of the disk 2. The pivot pin 21 thus is parallel to the plane of the disk 2 and is secured upon the yoke 1 or any other stationary part of the brake system by a bracket 26 bolted at 26c to the right-hand flank 26d of the yoke 1. Each of the brakeshoes 7 and 8 is formed with a respective stud 22 or 23 which likewise defines a respective axis parallel to the faces 2a and 2b of the disk 2 in the longitudinal median plane P thereof. These studs 22 and 23 are received in elongated slots 24 and 25 formed in the lever 20 on opposite sides of the fulcrum 21. The slots thus extend away from longitudinal median plane P in the direction perpendicular to the direction of movement of the brakeshoes 7 and 8 (arrow A). The longitudinal slots 24 and 25 serve not only to permit self-adjustment of the brakeshoes 7 and 8 to compensate for variations in tolerance due to the mounting of the mechanical brake or its original installation, but also to permit self-adjustment of these brakeshoes upon irregular or nonuniform wear of the respective brake linings 7c and 8c. The bracket 26 has a shank 26a connected by the screw 26c to the flank 26d of the yoke 1 and, bent at right angles to the shank 26a, a flange 26b in which the pin 21 is lodged. In this manner, the actuating lever 20 is "floatingly" mounted upon the bracket 26. Thus, it is rotatable about the axis of pivot 21 relative to the bracket 26 and is shiftable parallel to the brake disk 2 as represented by the arrow A. To facilitate this floating movement, an elongated slot 31 is provided in the bracket 26 in the direction of arrow B and pivot 21 is slidable therein. This floating arrangement also facilitates compensation for tolerance variations in mounting of the device and changes in the relationship of the brakeshoes to one another and to the actuating lever 20 upon wear of the respective brakeshoes.

Upon rotation of the lever 20 in the direction of arrow C (clockwise about the pivot 21), the disk 2 being considered to rotate in the direction of arrow D, the brakeshoe 7 is urged to the left (FIG. 2) and is frictionally entrained by the surface 2a of the disk in a self-tightening action which applies axial force between the brakeshoe 7 and the disk 2, thereby braking the rotation of this disk for immobilizing it in a locked condition. Concurrently, the brakeshoe 8 is drawn to the right and guided by surface 14 against the disk 2b without, however, a self-tightening action. In this condition, the brakeshoe 8 acts as a support against the disk 2, thereby preventing distortion thereof.

When the lever 20 is rotated in the counterclockwise sense, both brakeshoes are urged away from their respective guide surfaces 13 and 14 and no self-tightening action occurs. When the disk D is rotated in the opposite direction, movement of the lever 20 in the direction of arrow C (clockwise in FIG. 2) brings the brakeshoe 8 into frictional entrainment with the surface 2b of the disk 2 and causes a self-tightening action with a self-tightening force determined by the angle of inclination between the surface 12, 14 and the surface 2b; the brakeshoe 7 is forced into the recess 9 and its guide surface 13 is brought to bear upon the surface 11 without a self-tightening actuation of this shoe so that the brakeshoe 7 merely serves as a support against axial distortion of the disk 2. The operation of the device illustrated in FIGS. 5 and 6 is, of course, similar.

The invention described and illustrated is believed to admit of many modifications within the ability of persons skilled in the art, all such modifications being considered within the spirit and scope of the appended claims.

I claim:
1. In a disk-brake system having a brake disk rotatable relatively to a brake support disposed along the periphery of the disk, a pair of main brakeshoes mounted on said support on opposite sides of said disk, and fluid-controlled activating means for selectively bringing said main brakeshoes into engagement with said disk, the improvement which comprises:
    an auxiliary brake system including:
        a pair of auxiliary brakeshoes mounted on said support and confrontingly juxtaposed with one another on opposite sides of said disk,
        guide means on said support co-operating with said auxiliary brakeshoes for urging one of said auxiliary brakeshoes against said disk upon entrainment thereof by said disk in self tightening action while urging the other of said auxiliary brakeshoes against said disk in a direction counter to the self-tightening force of said one auxiliary brakeshoe, thereby preventing distortion of said disk upon application of the auxiliary brake system, and
    control means acting upon said auxiliary brakeshoes for applying said one brakeshoe to said disk for frictional entrainment therewith.
2. The improvement defined in claim 1 wherein said support is stationary with respect to the axis of rotation of said disk and said guide means includes a pair of camming surfaces formed directly in said support on opposite sides of the disk whereby said auxiliary brakeshoes are wedged between said surfaces and said disk, each of said surfaces being effective upon rotation of said disk relative to said support in a respective sense to apply self-tightening force to the respective brakeshoe but being ineffective for the application of self-tightening force upon rotation of the disk in an opposite sense.

3. The improvement defined in claim 2 wherein said control means includes a lever pivotally connected to said auxiliary brakeshoes for shifting same toward and away from said disk, said surfaces being inclined both to said disk and to the direction of movement of said auxiliary brakeshoes by said lever.

4. The improvement defined in claim 3 wherein said surfaces are parallel to one another.

5. The improvement defined in claim 3 wherein said surfaces are inclined at different angles to the disk in the respective directions of rotation of the disk for self-tightening action of the respective auxiliary brakeshoes.

6. The improvement defined in claim 3 wherein each of said auxiliary brakeshoes is provided with a respective guide face inclined to the disk at an angle corresponding to the angle of inclination thereto of the respective surface and slidingly engaging same.

7. The improvement defined in claim 3 wherein said auxiliary brakeshoes are provided with roller means engaging said surface.

8. The improvement defined in claim 3 wherein each of said brakeshoes is of generally T-shaped cross-section and has a shank portion extending perpendicularly to said disk and co-operating with said surface, and a head connected with said shank and provided with a respective brake lining, said support forming a brake yoke and having respective recesses receiving said auxiliary brakeshoes, said recesses being provided with grooves receiving said shanks and defining said guide surfaces.

9. The improvement defined in claim 8 wherein said grooves are of a width exceeding the thickness of said shanks by an amount less than that by which said recesses exceed in width the width of said heads whereby the flanks of said grooves support said brakeshoes against entrainment by said disk.

10. The improvement defined in claim 3 wherein said lever is fulcrumed about an axis parallel to the plane of said disk and disposed substantially in the median plane thereof perpendicular to the axis of rotation of said disk and is provided with a pair of guide slots extending in the direction of displacement of said auxiliary brakeshoes toward and away from said disk on opposite sides of said median plane, said auxiliary brakeshoes having studs pivotally and slidably received in the respective slots while extending parallel to the pivotal axis of said lever.

11. The improvement defined in claim 10, further comprising a bracket mounted upon said support and provided with a slot lying substantially in said median plane but perpendicular to the pivotal axis of said lever, the fulcrum of said lever being defined by a pin slidable in the slot in said bracket whereby said lever is shiftable parallel to said disk.

References Cited
UNITED STATES PATENTS 3,260,332    7/1966    Wells _____ 188—73

MILTON BUCHLER, *Primary Examiner.*

GEORGE E. A. HALVOSA, *Assistant Examiner.*